June 21, 1949.  H. A. FROTHINGHAM ET AL  2,474,101
KITCHEN CABINET HAVING TOP OPENING
WITH PEDAL OPERATED CLOSURE
Filed April 9, 1946
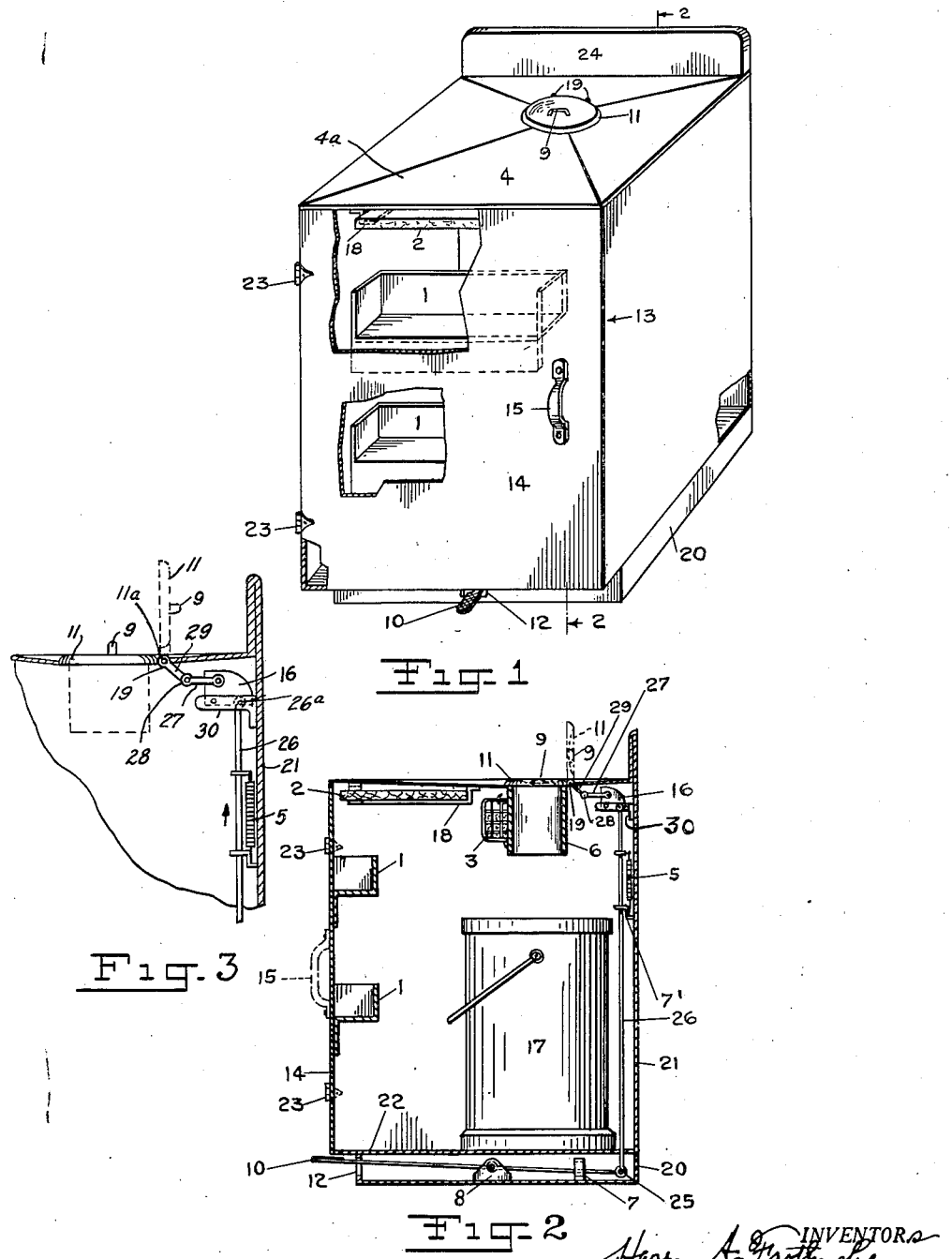

Patented June 21, 1949

2,474,101

UNITED STATES PATENT OFFICE 2,474,101

KITCHEN CABINET HAVING TOP OPENING WITH PEDAL OPERATED CLOSURE

Harry A. Frothingham and Harriett C. Frothingham, Stamford, Conn.

Application April 9, 1946, Serial No. 660,702

1 Claim. (Cl. 312—192)

Our invention relates to an improvement in a kitchen unit for preparing food and its novelty consists in the combination and arrangement of parts as will be more fully hereinafter pointed out.

There has always been a great need for a food preparing kitchen unit and many have attempted to solve this problem but the problem remains unsolved.

Our unit is adapted to fit into the modern standard built-in kitchen cabinet ensemble and furnishes a unique combination which solves the waste problem in the preparation of meat, fish, fruit and vegetables for cooking and the dining table.

Referring to the drawings—

Fig. 1 is a perspective view of my unit with portions broken away to show the interior construction; and Fig. 2 is a vertical section on the line 2—2 of Fig. 1.

Fig. 3 is an enlarged fragmentary view of a portion of Fig. 2.

In the drawings, 13 is a complete kitchen unit having a base member 20 and a main body member 21 with a floor 22; a top 4 in which is mounted a cover 11 having a handle 9. Said body 21 has a door 14 hinged at 23 and a door handle 15. In the rim under the cover 11 is rigidly mounted a funnel 6 on the side of which is rigidly secured a deodorant holder or basket 3. A garbage pail 17 is placed on the floor 22 directly underneath the funnel 6.

A pair of storage shelves 1 adapted to hold knives and other food preparing tools, are rigidly mounted on the inside of door 14 and a wooden cutting board 2 is adapted to be slidably mounted in a bracket 18 which is rigidly secured to the underside of top 4. An extension back 24 of the body 21 extends above the top 4, which top 4 is preferably covered with linoleum and is pitched to form gutters 4ª which drain into the funnel 6 when the cover 11 is open.

The cover 11 may be opened by hand by means of cover handle 9 but in ordinary operation will be opened by means of foot pedal 10 which moves in slot 12, is fulcrumed at 8 and hinged at 25 to push rod 26 connected at its upper end at 26ª in the toggle 16 mounted on bracket 30 pivoted at 16ª and toggle 16 has a toggle link 27 which is hingedly connected at 28 to cover lever 29 which is integrally secured at 11ª to said cover 11.

In operating the foot lever 10 by foot as it is pivoted over fulcrum 8 and passes through guide 7 and through hinge connection 25, push rod 26 will tension spring 5 secured at its lower end to bracket 7' and at its upper end to push rod 26 and through toggle 16, link 27, cover lever 29 and the hinge 19 of cover 11, said cover 11 will be thereby opened by means of the operation of foot lever 10 and spring 5 will normally insure the closing of said cover 11 when the foot pedal 10 is released.

Cutting board 2 is readily available on opening the closed door 14 and is located immediately under the top 4 and can be readily pulled out for use sliding in bracket 18 and can be placed on top 4 for use when a board is preferred for cutting directly on it rather than on the linoleum finished top 4.

The spring 5, as described, insures the cover 11 closing normally when the foot is removed from the foot lever 10 but when it is desired to leave the cover 11 open for a longer time, then the cover 11 can be pushed back by hand past the balancing point and spring 5 becomes temporarily inoperative and the cover 11 will remain in the open position. This may often be desirable as a long poultry, fish, meat, vegetable or fruit preparation is in operation as any liquids will run down the self-draining top 4 and into the funnel 6 and all waste matter can constantly be pushed toward the same and into garbage pail 17.

Our combination has many advantages as it furnishes a proper cleaning and preparing top for all fish, game, poultry, meat, vegetables and fruit with an immediate drain and refuse funnel into the garbage can from said top thus avoiding the carrying and spilling of any liquid or waste matter. It also at the same time conceals the garbage can and its odors and it also makes it possible to do this even though the operator's hands are not free as the open top can be made available by foot operation of foot pedal 10.

As all householders know, it is most important that garbage containers be conveniently located but that the sight and odor of garbage be avoided and our garbage container is both convenient and entirely enclosed and deodorized at all times.

It will be apparent that many different materials may be used in making our device but that it is adapted to be made of metal with a linoleum top and a wooden cutting board to operate therewith.

Many variations may be made in the adaptation and arrangement of parts of our invention without departing from the spirit and intent of the same and all such variations are comprehended within the disclosure and claim of said invention.

We claim:

In a kitchen unit, the combination of a cabinet having side walls and a bottom and having a closed base below its bottom, a door hinged on the cabinet and covering its entire front, a top to the cabinet having an opening in the center of pitched drains leading into said opening, a funnel leading from the bottom of said opening, a hinged cover mounted over said opening, a garbage container encased in said cabinet directly beneath said funnel, a foot operated fulcrumed lever mounted in said space between the bottom and base of said cabinet and hingedly connected to a push rod at the base of said push rod, a toggle connected to the upper end of said push rod, the other end of said toggle being connected by a hinge to a lever extending from an edge of said hinged cover and a spring connected at its lower end to a bracket supporting the upper end of the push rod and the other end of the spring being secured to the push rod.

HARRY A. FROTHINGHAM.
HARRIETT C. FROTHINGHAM.

REFERENCES CITED

The following references are of record in the file of this patent:

UNITED STATES PATENTS

| Number | Name | Date |
|---|---|---|
| 290,528 | Burckett | Dec. 18, 1883 |
| 736,522 | Hopkins | Aug. 18, 1903 |
| 1,070,547 | Slater | Aug. 19, 1913 |
| 1,130,503 | Franckaerts | Mar. 2, 1915 |
| 1,808,402 | Cooper | June 2, 1931 |